Dec. 19, 1961  G. F. BUJJONI  3,013,357
DUAL FISH HOOKS
Filed Oct. 30, 1959
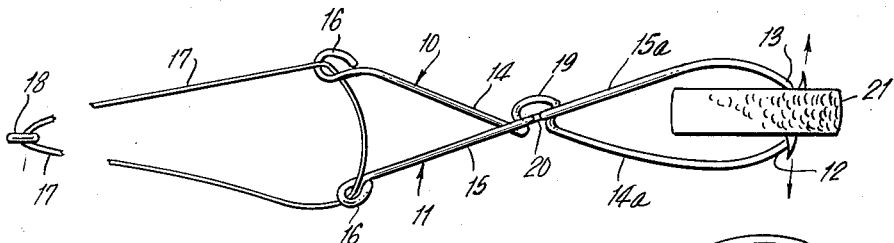
FIG. 1
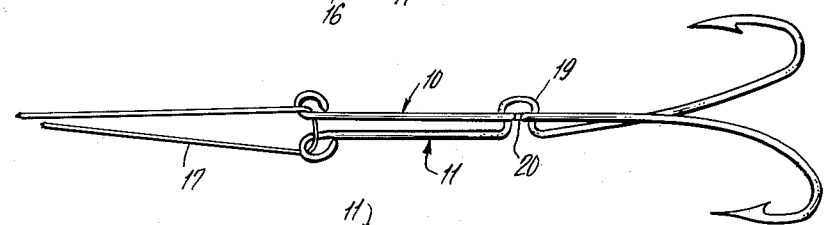
FIG. 2
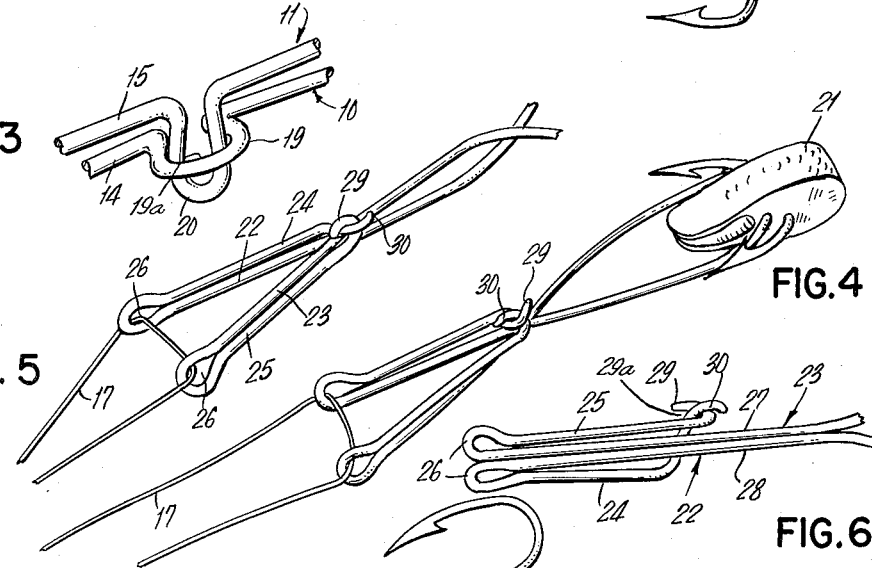
FIG. 3
FIG. 4
FIG. 5
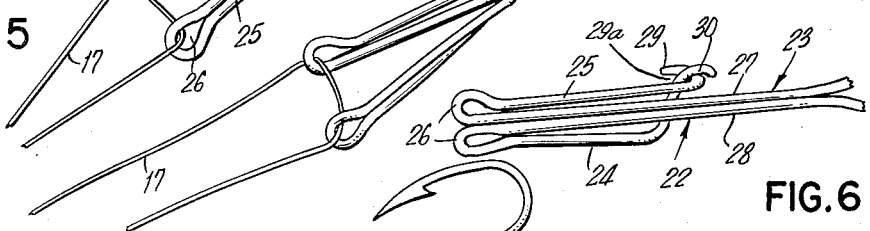
FIG. 6
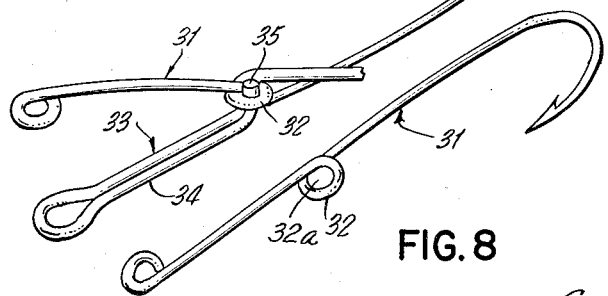
FIG. 7
FIG. 8
INVENTOR.
GEORGE F. BUJJONI
BY J. Ledermann
ATTORNEY

3,013,357
DUAL FISH HOOKS
George F. Bujjoni, 179 Griffith St., Jersey City, N.J.
Filed Oct. 30, 1959, Ser. No. 849,962
6 Claims. (Cl. 43—37)

This invention relates to fish hooks, and a primary object of the invention is the provision of certain new and useful improvements in fish hooks whereby it is assured that once the fish has taken the bait it is securely hooked with little or no possibility of freeing itself.

Another object of the invention is the provision of a dual fish hook consisting of two hooks mutually and separably pivoted together in substantially parallel planes with the barbs of the hooks extending in mutually opposite directions, with further means provided whereby upon taking the bait secured between and to both barbs the tug of the fish causes separation of the barbs, that is, movement about the pivotal connection between the hooks, in such a manner as to cause the barbs to pierce opposite sides of the fish's mouth. Moreover, the harder the fish tugs or pulls, the more securely do the barbs pierce and set in the fish.

A further object of the invention is the provision of a dual fish hook as above mentioned wherein the pivot connection between the two fish hooks is formed solely of normally interengaged but readily mutually separable deformations on the hooks so that, after a fish has been caught on the dual hook, the two hooks may be detached from each other to facilitate their removal from the fish.

The above broad as well as additional and more specific objects will be clarified in the following description wherein reference numerals refer to like-numbered parts in the accompanying drawing. It is to be noted that the drawing is intended primarily to illustrate the invention and that it is therefore neither desired nor intended to limit the invention necessarily to any or all of the exact details shown or described except insofar as they may be deemed essential to the invention.

Referring briefly to the drawing,

FIG. 1 is a top plan view showing one form of the dual fish hook of the present invention, showing the relative positions of the mutually pivoted hooks when baited and with the fishing line out in the water.

FIG. 2 is a similar view but it shows the relative positions of the two hooks after a fish has bitten and the fishing line has been tautened.

FIG. 3 is a fragmentary perspective enlargement of the dual fish hook of FIG. 1 and FIG. 2.

FIG. 4 is a perspective view of a modified form of the dual fish hook, with the hooks baited as in FIG. 1.

FIG. 5 is a fragmentary view similar to FIG. 4 but showing the relative positions of the hooks intermediate the positions in FIG. 4 and in FIG. 2, that is, just after the fish has struck.

FIG. 6 is a fragmentary side view of FIGS. 4 and 5.

FIG. 7 is a fragmentary perspective view of another modified form of the dual fish hook.

FIG. 8 is a perspective view of one of the fish hooks shown in FIG. 7.

Referring in detail to the drawing, and first to FIGS. 1–3, the dual fish hook includes the fish hooks 10 and 11 having the barbed ends or hook portions 12 and 13, respectively on shanks 14 and 15, respectively. The shanks of the hooks are provided with eyelets 16 through which a loop 17 on the end of a fishing line, not shown, is adapted to be threaded. The loop 17 may be secured to the line by means of a ring or the like 18 on the line. Of course other ways of securing the eyelets 16 to the fishing line, in order to carry out the intent of the invention, are possible.

Releasable pivotal engagement between the fish hooks 10 and 11 is provided in the shanks thereof. The shank 14 has an eyelet, socket or loop formed therein by deforming the shank, and this socket may be circular or substantially circular and lie substantially in the plane of the hook 10. The loop 19 has a through passage 19a therein. The shank 15 is provided with an elongated deformation in the form of a projection or hook 20, extending substantially at right angles to the plane of the fish hook 11. Thus the fish hook 11 is pivotally related to the fish hook 10 when the shank hook 20 registers in the loop 19. At the same time the two fish hooks are readily separable by drawing the shank hook 20 from the shank loop 19 through the passage 19a. By utilizing the springiness of the material of which the fish hooks are made, the sides of the deformation 20 may somewhat yieldably and frictionally engage the socket or loop 19 to tend to maintain the pivotal engagement while not offering substantial resistance to separation of the pivot-forming parts.

At 21 is shown a bait which may be in the form of a piece of bait fish, which the fish hook barbs engage by passing thereinto and, preferably, therethrough, in opposite directions. Thus the bait maintains the shank portions 14a and 15a in mutually extended positions, that is, extending at an angle from the pivot 19, 20. Consequently, also, the shank portions on the opposite side of the pivot also extend apart at an angle. The bait is dropped into the water with the line loop 17 threaded through the eyelets 16, and owing to the engagement of the bait between the hook barbs the two eyelets 16 remain spaced apart as illustrated in FIG. 1. It is now obvious that when a fish has taken the bait and tugs on the fish line, the stretching or tautening of the line loop 17 will tend to swing the two shanks into mutually superimposed position, thus causing the barbed ends of the hook to spread apart in the fish's mouth to securely hold the fish. It is also obvious that the harder the fish pulls, the more firmly will it be secured.

In the form of the dual fish hook illustrated in FIGS. 4–6, the device functions in the same manner as set forth above, but the structure of the pivotal engagement between the two fish hooks 22 and 23 is different. Each shank has a doubled-back portion, indicated respectively at 24 and 25, the eyelets 26, equivalent to the eyelets 16 of FIG. 1, being formed at the bights of the bends which form the doubled-back portions. The shanks of the fish hooks 22 and 23 are indicated at, respectively, 27 and 28, and they lie in mutual sliding contact in a common plane, as shown in FIG. 6. The portion 25 of the fish hook 23 has a substantially U-shaped loop or hook 29 at its extremity, formed by bending the extremity back toward the eyelet 26 thereon, leaving a through passage 29a therein. The portion 24 of the fish hook 22 has its extremity deformed to extend upward, FIG. 6, past both shanks 27 and 28, and it is then deformed into a hook 30 extending toward the barbed end of the fish hook. It is thus apparent from FIG. 6 that the two fish hooks may be releasably pivotally engaged into the position shown, in a simple manner, whence the interengaging parts 29 and 30 permit the fish hooks to pivot about each other with the shanks 27 and 28 sliding on each other. It is likewise apparent that the two fish hooks 22 and 23 may be readily disengaged from each other.

In the modification shown in FIGS. 7 and 8 the shank of one fish hook 31 has an eyelet, socket or loop 32 formed therein, provided with a through passage 32a. The other fish hook 33 has its shank doubled back at 34 as in the previously described modification of FIGS. 4–6, but its extremity 35 is bent to extend upward at right angles to the shank and is freely and slidably pivotally registered in the loop 32 through the passage 32a. Thus these two fish hooks are also separable.

The desirability of having the two fish hooks pivoted together has been made clear above. The purpose of having the two fish hooks at the same time readily separable is that this feature permits of easy removal of the fish hook from the hooked fish, for it is obvious that if the two fish hooks were not separable from each other it would be far more difficult to remove them from the fish's mouth.

The separability characteristic of the two parts of the pivot in each case described above does not lessen the effectiveness of the pivotal function of the fish hooks. For, first, the bait 21 between the opposed barbs of the fish hooks tends to hold the barber ends in substantially overlapping positions with respect to each other; and, second, the normal tenseness of the line or line loop 17 when in the water tends to prevent disengagement of the two parts of the pivot. Thus there is no danger that the fish hooks might separate in the water.

It is to be noted that, owing to the inherent resiliency of the material of which fish hooks are usually made, which material is usually steel, the pivotal interengagement of the instant fish hooks is additionally frictional to some extent, the degree of such frictional engagement being a matter of choice.

It is believed obvious that in the case of all of the forms of the device illustrated and described, the barbs will penetrate the mouth of the fish to a degree before they spread.

The invention having thus been described, what is claimed and desired to be secured by Letters Patent is as follows:

1. A dual fish hook device comprising two mutually separable fish hooks of resilient material each having a barbed hook portion at one end and an eyelet at the other end and a shank between said eyelet and said portion, the shanks having normally interengaging releasable pivot means pivotally securing the fish hooks together, the pivot means consisting solely of normally interengaging deformations in the shanks lying in planes at right angles to each other, one of said deformations consisting of a shank hook formed on one of said shanks, the other of said deformations consisting of a shank loop on the other of said shanks having a through passage receiving said shank hook in a pivotal and freely disengageable manner, the fish hooks normally lying in substantially parallel planes in close juxtaposition to each other and having the barbed hook portions thereof extending substantially in mutually opposite directions, the device being adapted to be baited by passing said barbed hook portions into opposite sides of the bait to hold the bait whereby the bait maintains the shanks at a relatively large acute angle to each other and hence said eyelets in spaced relationship to each other, the eyelets being adapted to have a loop on the end of a fishing line threaded therethrough to secure the device to the fishing line whereby when a fish takes the bait in its mouth and pulls on the line said fishing line loop tends to draw the eyelets together and thus spread said barked hook portions in the mouth of the fish, the fish hooks being separable from each other to facilitate removal thereof from the mouth of the fish by disengaging said deformations from each other.

2. A dual fish took device according to claim 1, said shank loop lying in the plane of the fish hook of which it is a part, said shank hook lying in a plane at right angles to the fish hook of which it is a part.

3. A dual fish hook device according to claim 2, said shank loop and said shank hook both having substantially the form of a U.

4. A dual fish hook device according to claim 2, said shank loop comprising a ring having said through passage extending axially therethrough, said one of said shanks including a doubled back extension extending from the eyelet thereof and terminating in said shank hook.

5. A dual fish hook device according to claim 1, said one of said shanks including a doubled back extension from the eyelet thereof terminating in said shank hook, said other of said shanks including a doubled back extension from the eyelet thereof terminating in said shank loop.

6. A dual fish hook device according to claim 5, said shank loop having said through passage facing toward the eyelet of said other of the shanks.

References Cited in the file of this patent

UNITED STATES PATENTS

| | | |
|---|---|---|
| 264,256 | De Forest | Sept. 12, 1882 |
| 745,437 | Hise | Dec. 1, 1903 |

FOREIGN PATENTS

| | | |
|---|---|---|
| 79,963 | Germany | Mar. 7, 1895 |